United States Patent [19]

Ookawa et al.

[11] Patent Number: 4,827,359

[45] Date of Patent: May 2, 1989

[54] VIDEO RECORDING AND REPRODUCING APPARATUS

[75] Inventors: Katsuhiro Ookawa; Keiji Hatanaka, both of Nagaokakyo, Japan

[73] Assignee: Mitsubishi Denki Kabushiki, Tokyo, Japan

[21] Appl. No.: 943,033

[22] Filed: Dec. 17, 1986

[30] Foreign Application Priority Data

Dec. 18, 1985 [JP] Japan .............................. 60-286808
Dec. 26, 1985 [JP] Japan .............................. 60-295437
Feb. 26, 1986 [JP] Japan .............................. 60-42712

[51] Int. Cl.$^4$ ........................................... A04N 5/783
[52] U.S. Cl. ............................... 360/10.3; 360/33.1; 358/335
[58] Field of Search ............... 360/10.3, 33.1, 10.2, 360/31, 25, 10.1; 358/335, 312

[56] References Cited

U.S. PATENT DOCUMENTS

4,290,081  9/1981  Foerster ............................ 360/10.3
4,403,260  9/1983  Kawamura ....................... 360/10.3

Primary Examiner—Alan Faber
Attorney, Agent, or Firm—Birch, Stewart, Kolasch & Birch

[57] ABSTRACT

A video recording and reproducing apparatus which is designed to store a reproduced signal in a field memory when a level of the signal reproduced from the recorded magnetic tape is larger than a previously established predetermined level and to read out the stored content, including detection, circuit for measuring the recording track width on the basis of an envelope detection signal of the reproduced signal which is obtained when the magnetic head traverses the recording track on said magnetic tape; and a circuit for establishing said predetermined level at a level optimum to the reproduction of the signal on the basis of the measured result.

10 Claims, 11 Drawing Sheets

forward direction ← A B A B A B A B A B A B

← forward direction

1 field period

VIDEO RECORDING AND REPRODUCING APPARATUS

FIELD OF THE INVENTION

The present invention relates to a video recording and reproducing apparatus, and more particularly to an apparatus capable of obtaining a high quality reproduced picture by reducing noisebars at the high speed reproduction with the use of a field memory.

BACKGROUND ART

A high speed reproduction operation of a video tape recorder (hereinafter referred to as "VTR") using a field memory will be described with respect to a case where it is conducted at a speed of even number times the usual speed such as four times the usual speed. Generally, an odd number times speed is used for high speed reproduction so as to utilize the property that the noisebars are locked due to the fact that the position of the noise of any field is the same as those of the other fields. On the contrary, when signal reproduction is conducted at an even number times speed the position of the noise and the position of the signal are replaced by each other at every field, and if this property is used in using a memory, it might be possible to reduce by half the number of noisebars.

Figure 1:
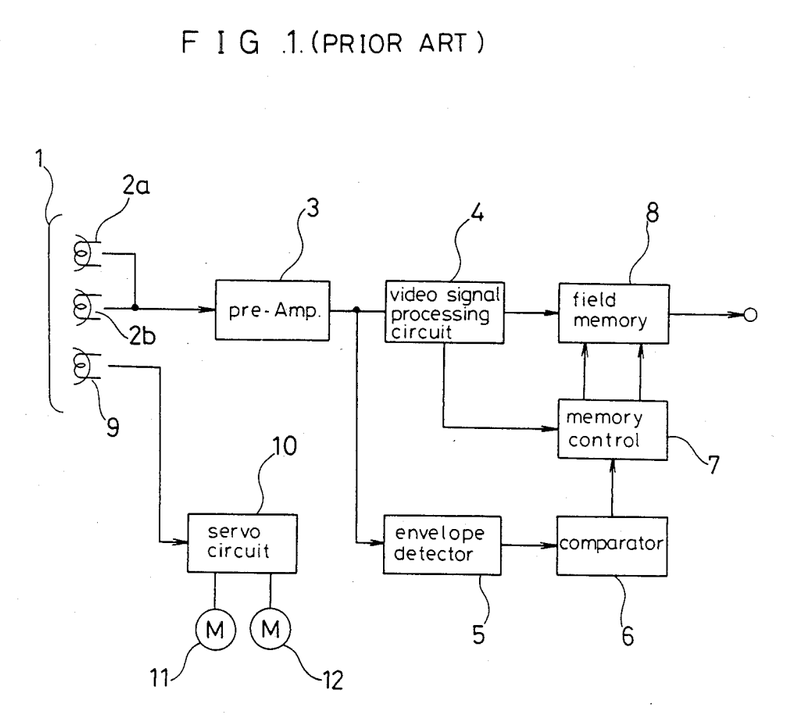
FIG. 1 is a block diagram showing a prior art video signal recording and reproducing apparatus.

FIG. 1 shows a high speed reproduction system of a prior art VTR. In FIG. 1, the reference numeral 1 designates a video tape onto which a signal is recorded, and the signals reproduced from the video tape 1 by the video heads 2a and 2b are input to the preamplifier 3, and thereafter, the reproduced signals are sent to the video signal processing circuit 4. The reference numeral 5 designates an envelope detector for detecting the envelope of the reproduced signal from the output of the preamplifier 3. The output of the detector 5 is input to the comparator 6 which compares the same with a predetermined level, and the output thereof is sent to memory control circuit 7 which generates timing and address signals for the writing in of the output signal which is output from the video signal processing circuit 4 to the field memory 8. The synchronizing signal is sent to the memory control circuit 7 from the video signal processing circuit 4.

The field memory 8 is a multiport memory (not shown), having a random output port and a serial output port as output ports, and if the serial port is used the writing in and the reading out from the memory can be conducted asynchronously. The operations are conducted asynchronously such that the reproduced signal from the video signal processing circuit 4 is written in the field memory 8 and the content of the field memory 8 is read out with the use of the serial port.

The reference numeral 9 designates a control head, and on the basis of the output of the control head 9 the servo circuit 10 conducts the running control of the tape in each operation mode by controlling the capstan motor 11 and the reel motor 12.

The device operates as follows.

Figure 2:
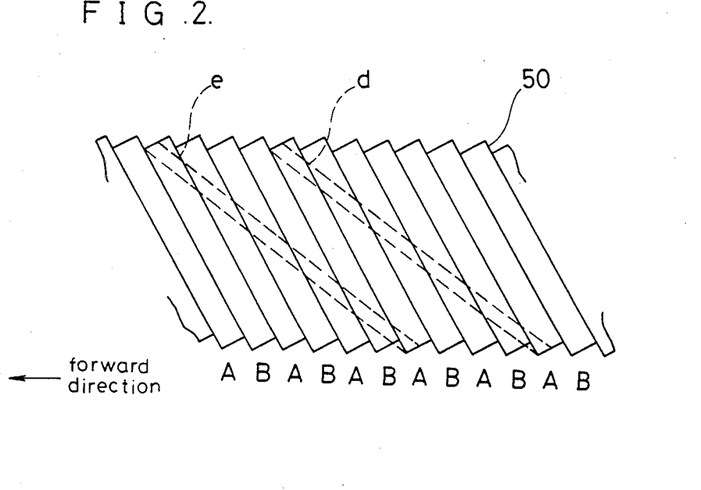
FIG. 2 is a diagram showing the head locus in a case where a guardbandless recorded video track is reproduced at a high speed.

It is supposed that the video tape 1 is conducting a high speed reproduction at a speed four times of the usual speed in the reverse direction. FIGS. 2 and 3 are diagrams for exemplifying the operation at this time. In FIG. 2, the reference numeral 50 designates a video track, the reference characters A and B represent the ozimuth recording, and the video head 2a has the same ozimuth as A and the video head 2b has the same ozimuth as B, respectively.

Figure 3A:
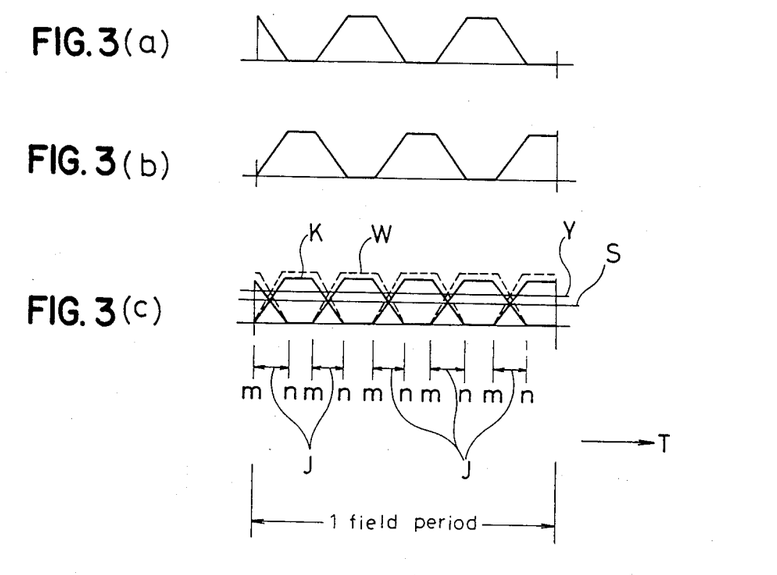
FIG. 3 is a diagram showing the preamplifier output of the reproduced signal of FIG. 2.

When the video head 2a traces the locus of the dotted lines (d) in the drawing, the reproduced signal, that is, the output of the preamplifier 3 is as shown in FIG. 3(a) from the relationship in the ozimuth recording. Similarly as above, when the video head 2b traces the locus of the dotted lines (e) in the drawing, the output of FIG. 3(b) is obtained. When the contents of the two fields of FIGS. 3(a) and (b) are mutually interpolated on the time axis, a video image of one field shown as K in FIG. 3(c) is obtained, and this is stored in the field memory 8 and displayed on a monitor. Herein, the envelope waveforms represented in FIG. 3(a), (b), and (c) show only the upper portions of the alternate waveform which has symmetrical configurations at both upper and lower portions.

Such one field content with almost no noisebar is obtained in a case where the width of the video track is approximately equal to or larger than the width of the magnetic head with no guardband. Actually, in a diffused machine having a head construction which couses the standard mode and the triple speed mode in a VHS system the specimen of the head is mainly directed to a triple speed mode. When the standard mode recording is conducted in a device having such a specimen a portion of one half to two thirds of the video track 50 becomes a guard band, and the video track becomes as 51 shown in FIG. 4. The outputs of the preamplifier 3 obtained by tracing the loci of the dotted lines f and g by the video heads 2a and 2b on the video track 51, respectively, become as shown in FIG. 5(a) and (b), respectively, and one field video image obtained when these are mutually interpolated on a time axis becomes as shown in FIG. 5(c).

Figures 5A, 5B, 5C:
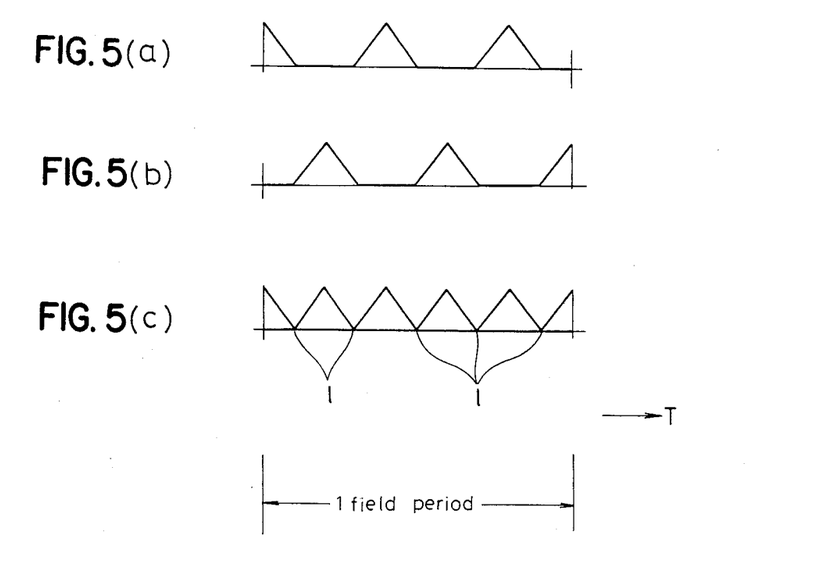
FIG. 5 is a diagram showing the preamplifier output of the reproduced signal of FIG. 4.

By the way, when the video image interpolated on the time axis shown in FIG. 3 and FIG. 5(c) is written into the field memory 8, the comparison voltage of the comparator 6 must be changed. That is, in FIG. 5(c), if the comparison voltage of the comparator 6 is made "0" level almost all of the envelope is written in into the field memory 8. Herein, although the S/N ratio is low thereat and it appears as a noise region having a noise width of some degree at the portion designated by l because it is almost impossible to obtain a signal information, the interpolated video image information continues smoothly.

However, when "0" voltage is applied to the comparator 6 similarly as above in the waveform K of FIG. 3(c), the portion designated by J is seen with blur because the content thereof is rewritten at every field, and noises appear at the portions designated by m and n at the interval both ends of the J. That is, two noisebars which have noise widths of some degree appear at portions where only a noisebar having quite a small width (approximately a width of one horizontal period) originally appears.

Next, a video tape into which the recording is conducted by a VTR having different video head widths to have a special reproduction function such as a high speed reproduction, a slow reproduction, or a still picture reproduction as its major function will be illustrated in the following.

Figure 6:
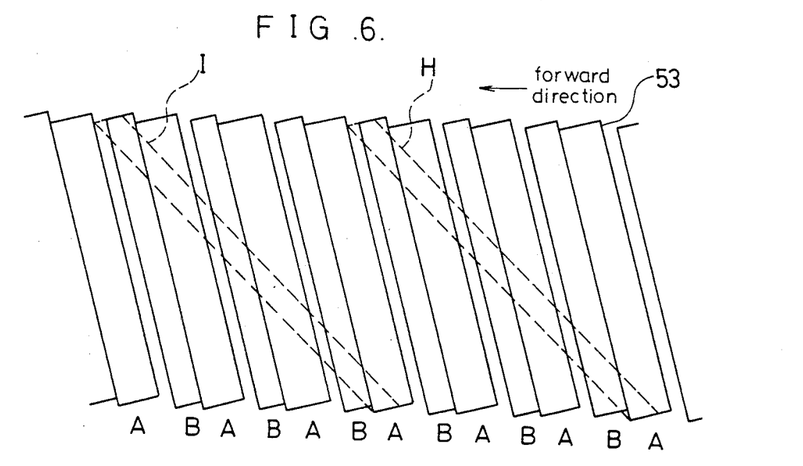
FIG. 6 is a diagram showing the head locus in a case where video tracks which are guardbandless recorded with different track widths are reproduced at a high speed.

Suppose that the video tape 1 is reproduced at a high speed of four times the normal speed in a reverse direction. FIGS. 6 and 7 are diagrams for exemplifying the operations then. In FIG. 6, the reference numeral 53 designates a video track recorded on a magnetic tape in a case where the track width of the adjacent tracks A and B are different, that is, the track width of the track A is larger than the track width of the track B. Furthermore, the reference characters A and B designate that ozimuth recordings are conducted, and the video head 2a has the same ozimuth as that of A, and the video head 2b has the same ozimuth as that of B.

Figure 7A:
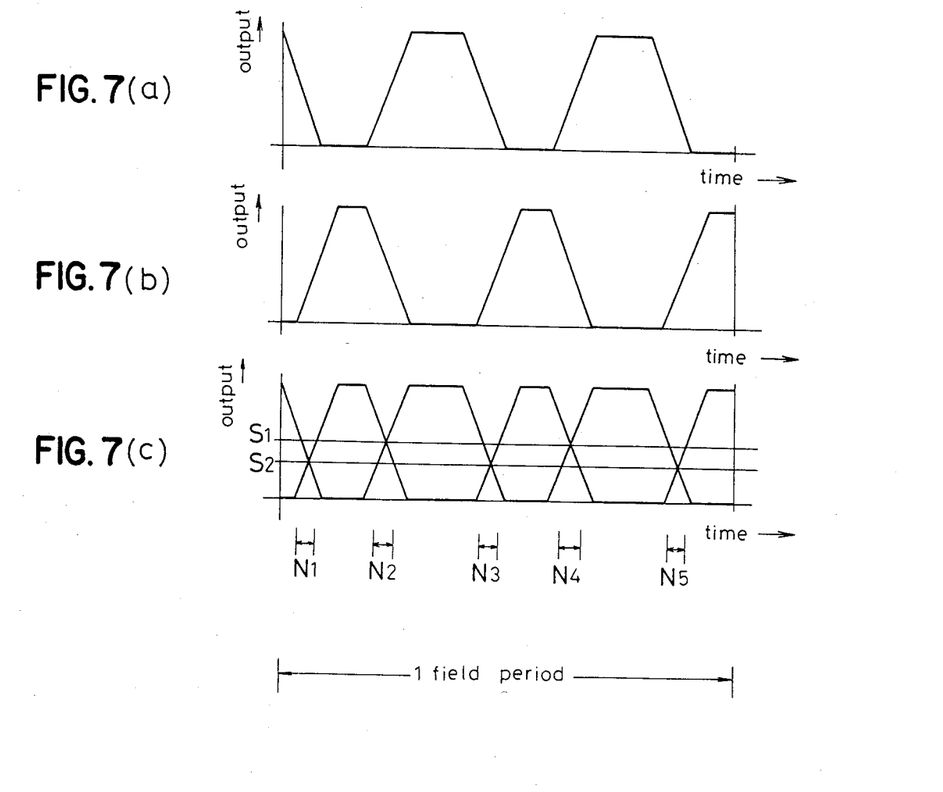
FIG. 7 is a diagram showing the preamplifier output of the reproduced signal of FIG. 6.

When the video head 2a traces the locus of the dotted line H in the drawing, the output of the envelope detector 5 of the reproduced signal becomes as shown in FIG. 7(a) from the relationship on the ozimuth recording. Similarly as above, when the video head 2b traces the locus shown by the dotted line I, the output of FIG. 7(b) is obtained. When the contents of the two fields shown in FIG. 7(a) and (b) are interpolated with each other on the time axis, one field video image shown in FIG. 7(c) is obtained, and this is stored in the field memory 8 and displayed on a monitor. The envelope waveforms shown in FIG. 7(a), (b), and (c) show only the upper portions of the alternate waveforms which have configurations symmetrical at both upper and lower sides.

By the way, when the video image interpolated on the time axis shown in FIG. 7(c) is written into the field memory 8, the comparison voltage of the comparator 6 should be established at a predetermined value, but when the track widths of A and B are different from each other as shown in FIG. 6, there arises an inconvenience if the value of the comparison voltage is established at a constant value.

That is, when the comparison voltage of the comparator 6 is established at a constant value $S_1$, the portions of $N_2$ and $N_4$ are smoothly interpolated to result in a continued screen image, but at the portions of $N_1$, $N_3$, $N_5$ there are no reproduced signals, thereby producing noisebars on the screen. Furthermore, when the comparison voltage is established at $S_2$, the portions of $N_1$, $N_3$, $N_5$ smoothly continue, but the content is written in twice at every field at the portions of $N_2$, $N_4$. These portions are seen with blur on a screen, and noises appear at both ends thereof.

In any way, it is not possible to obtain a high quality video image with a smoothly continuing interpolated image.

As described above, in a device which conducts a high speed reproduction at a speed an even number of times the usual speed with the use of a field memory and conducts the interpolating of the content of each field to obtain an information signal, it is not possible to reduce the number of noisebars and narrow the widths of the noisebars in a case where the comparison voltage of the comparator for comparing the reproduced signal is not changed depending on the video track width on a tape thereby to adjust the writing in range of the memory.

SUMMARY OF THE INVENTION

An object of the present invention is to provide a video signal recording and reproducing apparatus capable of obtaining a high quality video image having a minimum noisebar width of the signal reproduced from the field memory at a high speed reproduction even in a case where the video track width on a tape varies dependent on a tape.

A second object of the present invention is to provide a video signal recording and reproducing apparatus capable of obtaining a high quality video image having a minimum noisebar width of the signal reproduced from the field memory at a high speed reproduction even in a case where the video track widths on a tape are different depending on each tape and the output levels of the reproduced signals are different from each other.

A third object of the present invention is to provide a video signal recording and reproducing apparatus capable of obtaining a high quality video image having a minimum noisebar and blur of the signal reproduced from the field memory at a high speed reproduction even in a case where the widths of the tracks recorded on the same tape are different from each other at every track.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, the recording track width on a tape is detected from the envelope detection signal with the use of a microcomputer, and the optimum reference voltage obtained on the basis of the detection result is supplied to the comparator as a comparison voltage.

Furthermore, according to the present invention, the recording track width and the output level of the reproduced signal are detected from the envelope detection signal with the use of a microcomputer, and an optimum voltage obtained on the basis of the detection result is supplied to the comparator as a comparison voltage.

Furthermore, according to the present invention, the different track widths recorded on a tape are detected from the envelope detection signal with the use of a microcomputer, respectively, and an optimum voltage obtained on the basis of the detection result is supplied to the comparator as a comparison voltage with being switched in a field.

According to the present invention, the track width with which a signal is recorded on a tape is automatically detected, and the voltage to be supplied to the comparator is switched in accordance therewith so as to minimize the noisebar and the blur on a screen, whereby operations such as narrowing the width of the noisebar directly manually by watching the picture image reproduced from the memory are avoided. Furthermore, unrequired noisebars will not be displayed, thereby making it possible to obtain a high quality reproduced picture image easily.

DETAILED DESCRIPTION OF THE PREFERRED EMBODIMENTS

Figure 8:
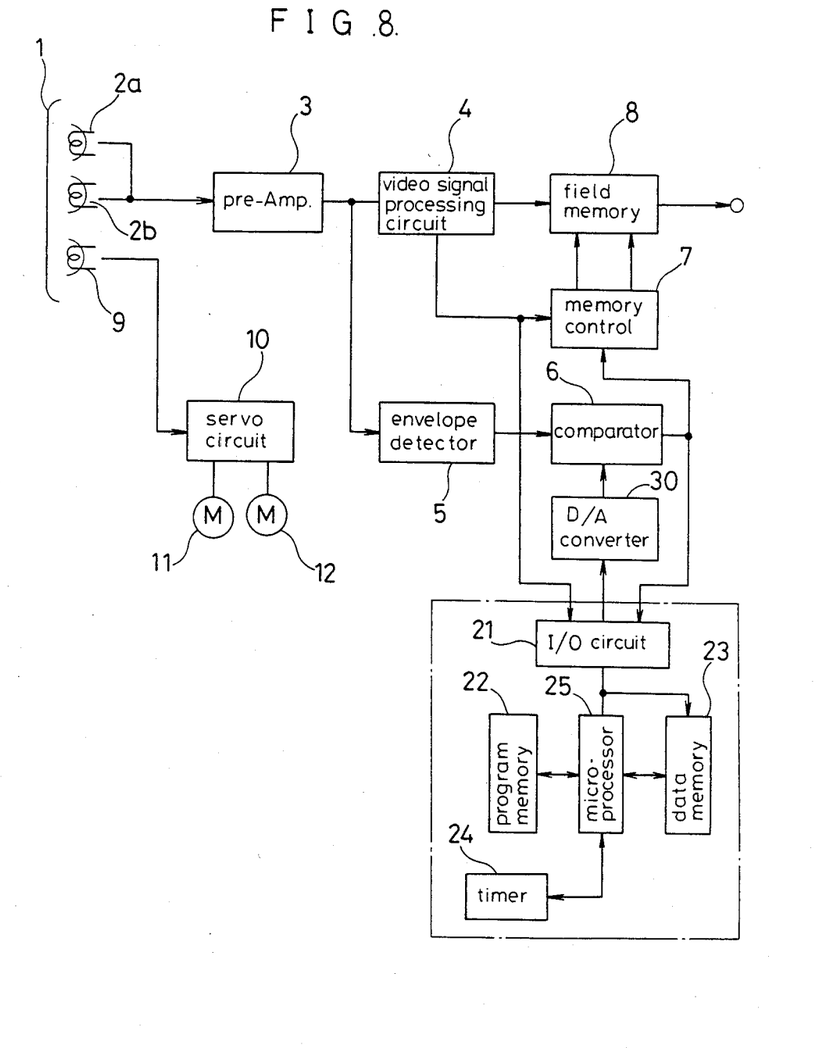
FIG. 8 is a block diagram showing a video recording and reproducing apparatus as an embodiment of the present invention.

In order to explain the present invention in detail, reference will be particularly made to FIG. 8.

In FIG. 8, the reference numeral 20 designates a one chip microcomputer. The reference numeral 21 designates an input/output circuit for receiving a synchronous signal from the video signal processing circuit 4 and the output from the comparator 6, and outputting an optimum voltage as a comparison voltage to the comparator 6 through a D/A converter 30. The reference numeral 23 designates a data memory for storing data temporarily. The reference numeral 24 designates a timer having a timer function and a timer memory. The reference numeral 25 designates a microprocessor for conducting a processing operation. The reference numeral 22 designates a program memory for storing the instructions of the operation. The microcomputer 20 and the comparator 6 constitute means for detecting the width of the video track on the video tape 1. The microcomputer 20 and the D/A converter 30 constitute means for establishing the level of the comparison voltage to be supplied to the comparator 6. The other construction is the same as that of the prior art device, and the same reference numerals designate the same or corresponding elements as those shown in FIG. 1.

The device will be operated as follows.

First Mode Operation

Figure 4:
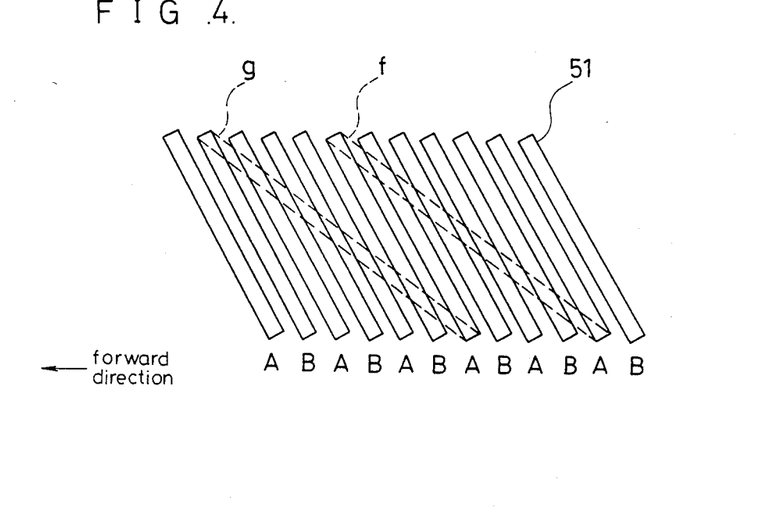
FIG. 4 is a diagram showing the head locus in a case where a signal with guardband recorded on a video track is reproduced at a high speed.

Suppose that the video heads 2a and 2b reproduce the loci f and g of the video track 51 of FIG. 4 on the video tape 1 in a reverse direction at a four times speed. The reproduced envelopes obtained then become as shown in FIG. 5(a) and (b), and the output from the microcomputer 20 is supplied to the comparator 6 through the D/A converter 30 so as to provide a comparison voltage of about one third of the maximum voltage of the envelopes as a comparison reference voltage of the comparator 6. Herein, the maximum voltage is approximately determined by the preamplifier 3, and a voltage of about one third of the maximum voltage is previously known. Furthermore, the voltage of about one third is selected as a comparison reference voltage taking into consideration the noise margin of the reproduced signal and the superimposing of the D/C component caused by the envelope detector 5.

Figures 9A, 9B, 9C, 9D:
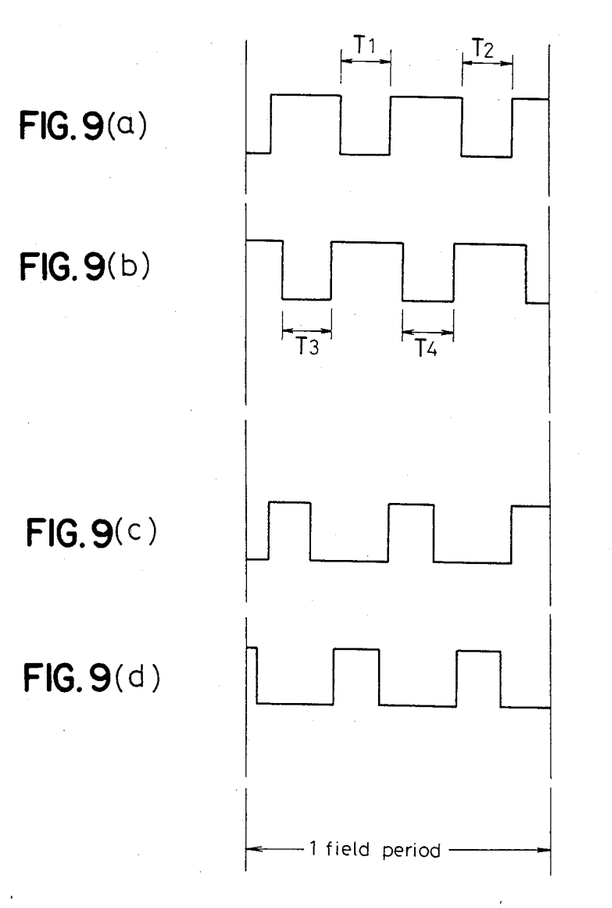
FIG. 9 is a timing chart for explaining the operation of the device of FIG. 8.

When such a voltage is supplied to the comparator 6 as a comparison voltage thereof, the two field outputs obtained from the comparator 6 become as shown in FIGS. 9(a) and (b), respectively. Herein, the logic levels of FIGS. 9(a) and (b) denote the reading out mode (level "H") and the writing in mode (level "L") of field memory 8, respectively.

Herein, the writing in mode and the reading out mode are those using the random input port and output port of the multiport field memory 8, respectively, the reading out mode does not mean that the memory content is actually read out, but rather that the memory content is not written in. That is, the output of the memory content in the actual reading out mode is conducted using the serial port, and the random input presumes that it is conducted asynchronously.

Herewith, when the time periods of the level "L" of $T_1$, $T_2$, $T_3$, and $T_4$ shown in FIG. 9(a) and (b) are measured, the width of the track in which the signal is recorded on a tape is obtained. For example, when the periods of the level "L" of $T_1$, $T_2$, $T_3$, and $T_4$ are short, the video track widths are narrow. Especially, when the period of the level "H" is longer than the period of the "L", it means that there is a guardband. Similarly, the cases of FIG. 9(c) and (d) which show the outputs of the comparator 6 obtained from FIG. 3(a) and (b), respectively, have a long period of the level "L", and this means the video track width is wide. The measurement of the time periods of $T_1$, $T_2$, $T_3$, and $T_4$ is conducted over the two field periods. This is because there may be a possibility that the track widths are different from each other for every field. From the time of the level "L" obtained over the two field periods as described above, various track widths are detected.

From the measured results of the recording track widths obtained in this way, a table is referred to which recites optimum reference voltages to the comparator 6 supposing that the recordings are conducted at various track widths, and an optimum voltage corresponding to each track width is generated through the D/A converter 30. The above-described table is previously written into the program memory 22 in the microcomputer 20.

In this way, if the voltage of the value S in the waveform shown in FIG. 3(c) is supplied to that which is recorded in the track 50 of FIG. 2 and approximately "0" voltage is supplied to that which is recorded in the track 51 of FIG. 4 as a comparison voltage of the comparator 6, a reproduced signal having a smoothly continuing envelope which is interpolated at every field is written in into the field memory 8, and a reproduced picture which has a high quality, a narrow band of noisebars, and has no noisebars appearing at unrequired portions is displayed on a display screen.

Figure 10:
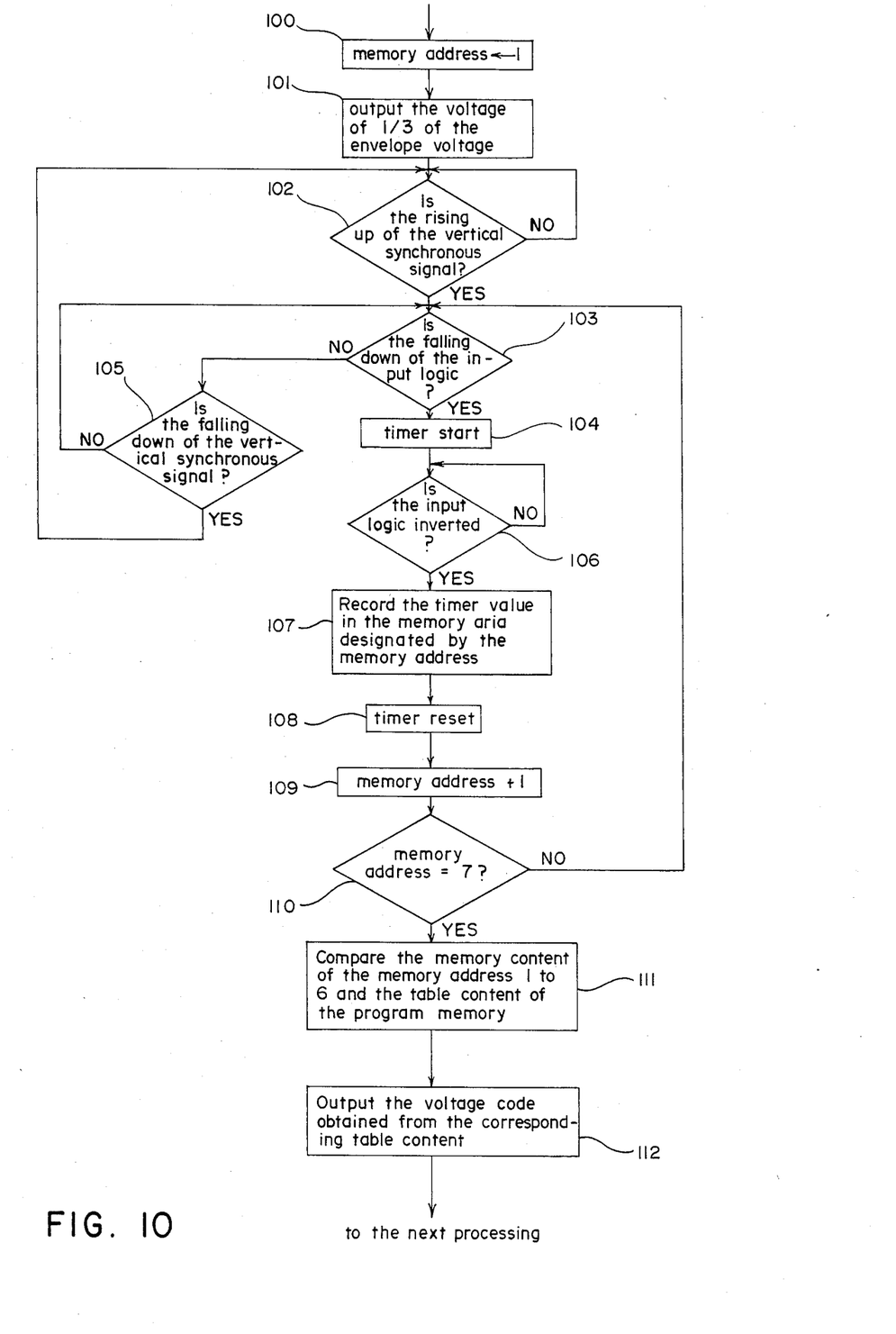
FIG. 10 is a diagram showing the flowchart for explaining the operation of the device of FIG. 8 at a first mode.

The above operation is described with reference to the flowchart shown in FIG. 10. In FIG. 10, the vertical synchronous signal is made a reference of the time axis, and the level at the vertical blanking period is made "L".

In the flowchart of FIG. 10, at first the address of the data memory 23 in the microcomputer 20 is initialized thereby to establish an address No. 1 (step 100). Next, in order to supply a voltage of about one third of the maximum voltage of the envelope signal to the comparator 6, a voltage code is output to the D/A converter 30 through the I/O circuit 21 (step 101). After conducting an initial establishment as described above, the rising edge of the vertical synchronous signal obtained from the video signal processing circuit 4 is detected (step 102), and then the falling edge of the output from the comparator 6 is detected for the writing into the field memory 8 (step 103). When this is detected, the timer 24 in the microcomputer 20 is initialized to start (step 104). When the rising edge of the vertical synchronous signal is not detected, the processor waits until it is detected. When the falling edge of the output signal from the comparator 6 is not detected, the falling edge of the vertical synchronous signal is detected (step 105), and it is judged as to whether the detection operation has proceeded to the next field. When the falling edge of the vertical synchronous signal is detected, it is restored to the initial state to provide for the processing at the next field from the rising edge of the vertical synchronous signal. If the processor is not detected, it waits until the logic level of the output signal from the comparator 6 falls.

Next, after the start of the timer it is judged as to whether the logic level of the output from the comparator 6 is inverted or not (step 106). If the logic level is inverted, the timer value of the timer 24 in the microcomputer 20 is recorded (step 107) in the address designated memory area of the data memory 23, and thereafter the timer 24 is reset (step 108). Then, the memory address is renewed by +1 (step 109). That is, after the timer value is written in into the designated address No. 1 in the processing step 100, the address becomes No. 2. Thereafter, it is judged as to whether the address value which is added by +1 in the processing step 109 is equal to "7" (step 110). This is because there exist 6 periods of the level "L" including the periods of $T_1$, $T_2$, $T_3$, and $T_4$ in the waveforms of FIG. 9 (a) and (b), the memory addresses corresponding thereto are 1 to 6, and accordingly the memory address 7 means that the measurement is completed.

When the judgment result at the step 110 is negative, the device enters the preparation for the next measurement. If the judgment result is affirmative, it means that the measurement of the envelope portions over the two field periods is completed, and the contents obtained by the measurements up to now, that is, the contents of the addresses No. 1 to 6 in the data memory 23 are compared with the table values which are previously generated in an area of the program memory 22 in the microcomputer 20 (step 111). In the table herewith, optimum comparison voltages to be supplied to the comparator 6 which are previously experimentally obtained corresponding to each recording track width on a tape are recorded. Accordingly, the optimum voltages corresponding to each recording track width in accordance with the measured result is selected from the table, and this voltage code is output (step 112). Herein, the code designates a code of BCD represented by a binary number.

Second Mode Operation

Figure 11:
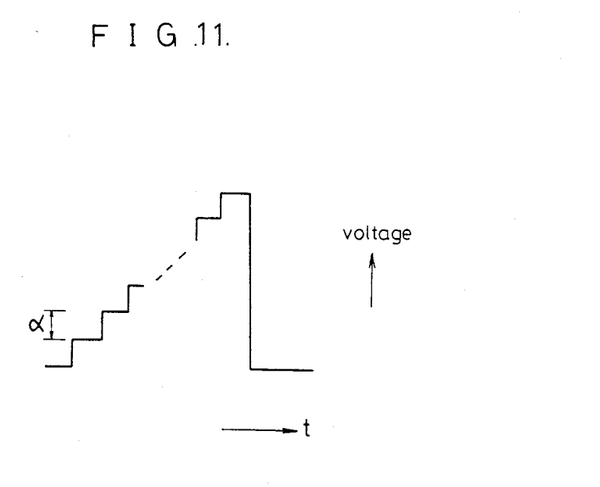
FIG. 11 is a timing chart for explaining the other operation of the device of FIG. 8.

A second embodiment of the present invention shown in FIG. 8 which supplies the optimum voltage to the comparator as a comparison voltage on the basis of the detected results of the recording track width and the output level of the reproduced signal by further detecting the output level of the reproduced signal will be described. The detection of the level of the reproduced signal is conducted in such a manner that a voltage larger than a predetermined voltage which is used for the detection of the recording track width is gradually increased as a comparison voltage of the comparator 6, and the measurement of the level of the reproduced signal is conducted in the period of the level "L" including those of $T_1$, $T_2$, $T_3$, and $T_4$. That is, the output from the microcomputer 20 is varied successively, and a voltage of stepwise configuration shown in FIG. 11 is generated by the D/A converter 30, and this is supplied to the comparator 6 as a reference voltage. When such a voltage is supplied, the reference voltage of the comparator 6 rises up, and at the same time the period of the level "L" of the output of the comparator 6 becomes shorter, finally the signal becoming the level "H". The output from the microcomputer 20 at this timing is the maximum level of the reproduced signal. Thus the level of the reproduced signal is detected.

From the measurement results of the recording track width and the output level of the reproduced signal obtained in this way, a table is referred to which recites optimum reference voltages of the comparator 6 supposing that there exist various recording track widths and reproduced signal output levels, and the optimum voltage corresponding to each track width and reproduced signal level is generated through the D/A converter 30. The above-described table is previously written into the program memory 22 of the microcomputer 20.

In this way the voltage of the value S of the waveform K shown in FIG. 3(c) is given to the one which is recorded by the track 50 shown in FIG. 2, and the voltage of Y is given to the one which has a large reproduced signal level as shown as W of FIG. 3, and approximately zero voltage is given to that in which the recording is conducted by the track 51 shown in FIG. 4, respectively, as a comparison voltage of the comparator 6, whereby a reproduced signal having the envelopes interpolated at every field so as to make the signal continue smoothly is written into the field memory 8, and a high quality reproduced video image which has a narrow noisebar width and no noisebars appearing at unrequired portions is obtained.

The above operation will be described with reference to the flowchart shown in FIG. 12. Herein, the vertical synchronous signal is made a reference of the time axis, and the level at the vertical blanking period is made "L".

Figure 12:
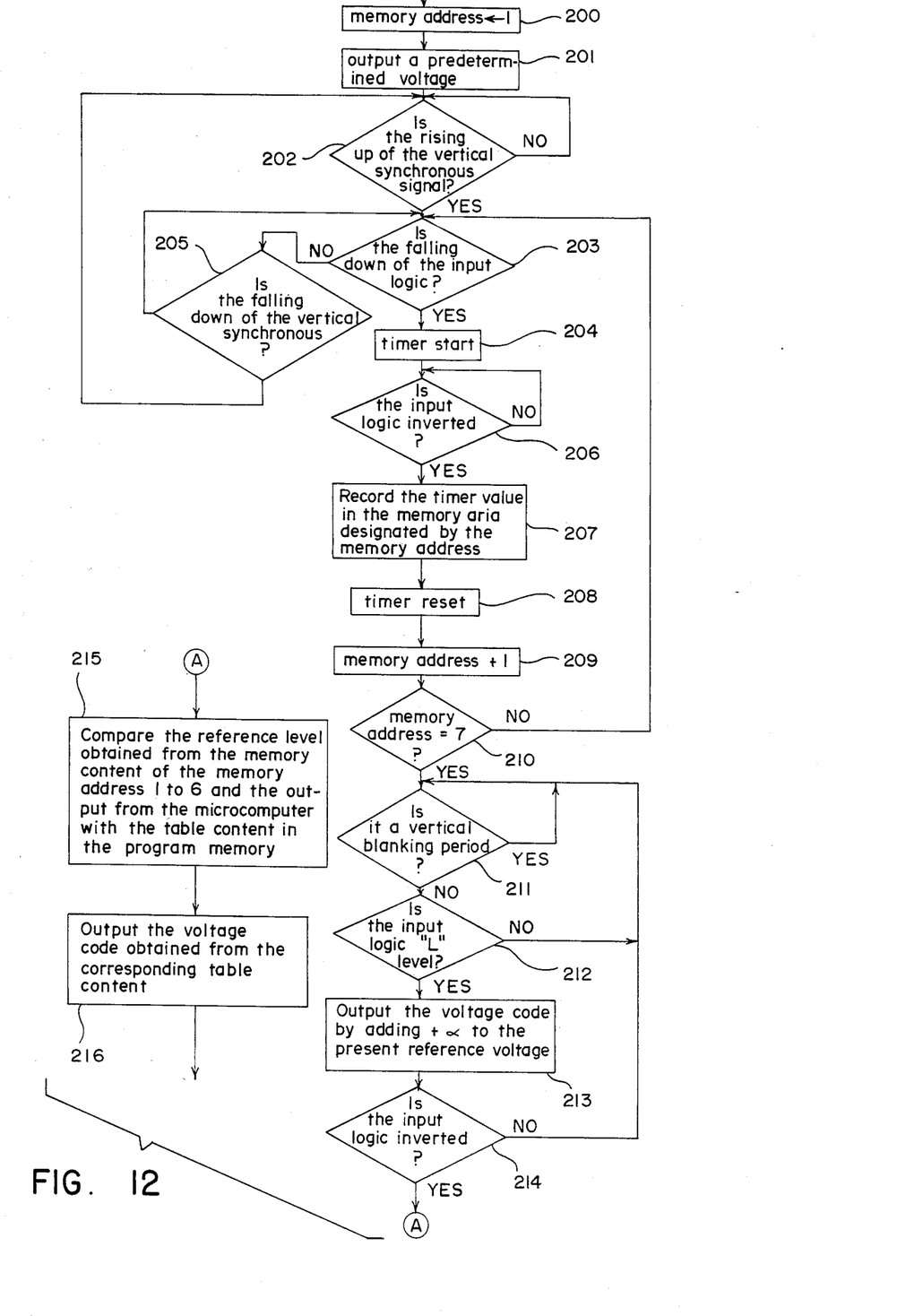
FIG. 12 is a flowchart for explaining the second mode of operation of the device of FIG. 8.

In the flowchart of FIG. 12, first of all, the address of the data memory 23 in the microcomputer 20 is initialized to establish the address No. 1 (step 200). Next, a predetermined voltage is supplied to the comparator 6 which is determined by a voltage code output to the D/A converter 30 through an I/O circuit 21 (step 201). After an initial establishment is conducted in this way, and when the rising edge of the vertical synchronous signal output from the video signal processing circuit 4 is detected (step 202), the falling edge of the output of the comparator 6 is detected (step 203) to conduct writing into the field memory 8. When this is detected, the timer 24 in the microcomputer 25 is initialized to start (step 204). When the rising edge of the vertical synchronous signal is not detected, it waits until it is detected. Furthermore, when the falling edge of the output signal from the comparator 6 is not detected, the falling edge of the vertical synchronous signal is detected (step 205), and it is judged as to whether it has proceeded to the next field. When the falling edge of the vertical synchronous signal is detected as a result, it restores to the initial state to provide for processing at the next field from the timing of the rising edge of the vertical synchronous signal. If it is not detected, it waits until the logic level of the output signal from the comparator 6 falls.

Next, after the timer start, it is judged as to whether the logic level of the output from the comparator 6 is inverted or not (step 206). If it is inverted, the timer value of the timer 24 in the microcomputer 20 is recorded (step 207) in the address designated memory area of the data memory 23, and the timer 24 is reset (step 208). Then, the memory address is renewed by +1 (step 209). That is, the timer value is written in into the address No. 1 designated by the processing step 200, and thereafter the address number becomes No.2. Then, it is judged as to whether the address value added to +1 in the processing step 209 has become equal to "7" (step 210). This is because the corresponding memory addresses are No. 1 to 6 at the six points of the periods of the level "L" including the periods of $T_1$, $T_2$, $T_3$, and $T_4$ in FIG. 9(a) and (b), and a memory address "7" means that the measurement is concluded.

Herein, when the judgment result at the step 210 is negative, the processing step enters the preparation for the next measurement. On the contrary, when the judgment result at the step 210 is affirmative, it means that the measurement of the envelope portions over two fields period is concluded, and thus the recording track width is measured.

Next, the level of the reproduced signal is measured except for the vertical blanking period (step 211). That is, whether the output level of the comparator 6 is "L" or not is judged (step 212). Herein, when the level is "L", it means that it corresponds to the portions of the previously measured six points of large reproduced signals including the timer periods of $T_1$, $T_2$, $T_3$, and $T_4$. Accordingly, if the level is not "L" the reproduced signal level is small and it is out of the measurement range, and the device waits until the level becomes "L". Herein, when the level is in the measurement range a voltage code of $+\alpha$ is added to the voltage code of the output of the microcomputer 20 at present, and it is output to the D/A converter 30 through the I/O circuit 21 (step 213) to be made a reference voltage of the comparator 6. Herein, $+\alpha$ is a voltage code of one step for making a stepwave as shown in FIG. 11 as a reference voltage of the comparator 6. Thereafter, the microcomputer 20 judges as to whether the logic level of the output from the comparator 6 is inverted to the level "H" or not (step 114). If not, the level has not yet reached the reproduced output level, and the step returns to the step 211 to repeat the processings by adding $+\alpha$ to the reference voltage. Thus, an A/D conversion is conducted by the comparator 6 and the microcomputer 20. This processing is conducted discontinuously while the level of the output from the comparator 6 in the measurement range is "L". This is because the time period of the level "L" in the measuring range is quite long as compared with the processings of the steps 211 to 214. Herein, when the logic level is inverted at the processing step 214, the output code from the microcomputer 20 at this timing represents the level of the reproduced signal.

Next, the contents obtained by the measurements up to now, that is, the contents of the addresses No. 1 to 6 in the data memory 23 and the output code of the microcomputer 20 are compared with the table values which are generated at the area of the program memory 22 in the microcomputer 20 previously (step 215). In this table the optimum comparison voltages to be supplied to the comparator 6 which are previously experimentally obtained corresponding to the recording track width on a tape and the reproduced signal level are recorded. Accordingly, an optimum voltage is selected to be output in accordance with the reproduced signal level corresponding to the recording track width among the data in the table (step 216). Herein, the code is a BCD code represented by a binary number.

The Third Mode Operation

Unlike the first and second modes wherein the track widths are different for each tape, the embodiment of FIG. 8 will be operated as follows in a case where the track widths are different for each track of the same tape.

Figure 13A:
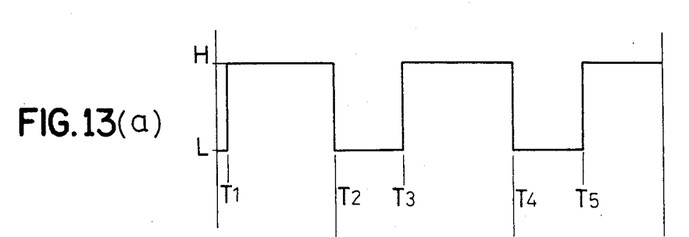
FIG. 13 is a timing chart for explaining the other operation of the device of FIG. 8.
Figure 13B:
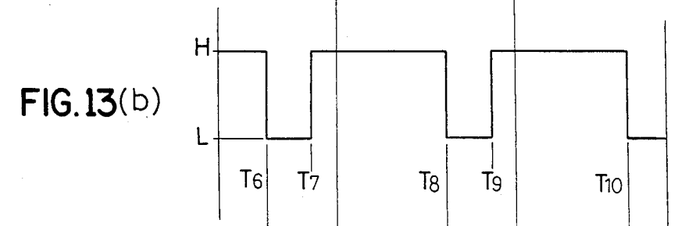
Figure 13C:
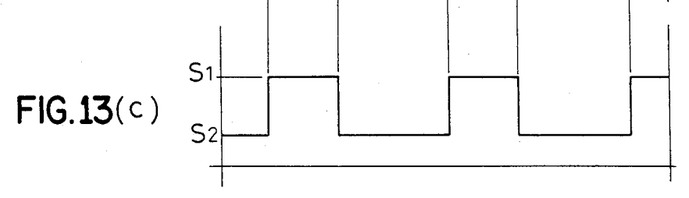
Figure 13D:
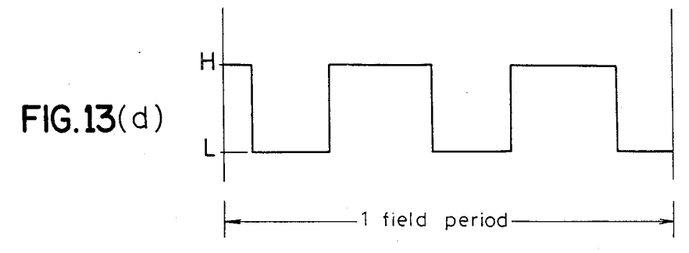

Now suppose that the tracks H and I of the video track 53 of FIG. 6 in a magnetic tape 1 are reproduced by the video heads 2a and 2b, respectively, in a reverse direction at a four times speed. The reproduced envelopes obtained at this time are shown in FIG. 7(a) and (b), respectively. First of all, a voltage about four fifths of the maximum voltage of this envelope is supplied to the comparator 6 as a comparison voltage through the D/A converter 30 by a microcomputer 20. Herein, the maximum voltage is approximately determined depending on the output of preamplifier 3, and the voltage of about four fifths the maximum previously known. The voltage of about four fifths signifies that when the comparison voltage of the comparator 6 is switched, this voltage is used for determining the timing for replacing the comparison voltage, and this voltage should be selected at be a voltage to which two adjacent envelopes do not overlap when envelope signals obtained over two fields period are interpolated with each other on a time axis. This voltage corresponds to a voltage of four fifths of the maximum voltage of the reproduced envelope. Then, the outputs from the comparator 6 over the two field periods are shown in FIG. 13(a) and (b), respectively. In FIG. 13, the period of a voltage larger than four fifths is represented by the level "L". Herein, the time $T_1$ to $T_{10}$ when the logic level is inverted is measured. When the time periods while the level is "L" ($T_3$ to $T_2$, $T_5$ to $T_4$, $T_7$ to $T_6$, $T_9$ to $T_8$) are measured, the width of the track with which the signal is recorded on a tape 1 is obtained. This exists because there is a relation that the track width is narrower as the time period of the level "L" is shorter. Furthermore, the reason why the time period is measured over two fields is because there are various cases where recording is conducted with different head widths dependent on the field. A table in which optimum reference voltages to the comparator 6 are previously determined when the recording is conducted with various track widths is referred to in accordance with the time periods of the level "L" obtained over a period of two fields as described above, and the optimum voltages corresponding to each track width, that is, voltages corresponding to $S_1$ and $S_2$ of FIG. 7(c) are determined. The table is previously written into the program memory 22 of the microcomputer 20. In order to obtain a picture image which has the least noisebars and blur the reference voltage is switched by the microcomputer 20 such that the reference voltage of the comparator becomes $S_2$ in the periods $N_1$, $N_3$, and $N_5$, and the reference voltage becomes $S_1$ in the periods $N_2$ and $N_4$. That is, as shown in FIG. 13(c), the comparison voltage is alternately switched between $S_1$ and $S_2$ in the time periods of $T_6$, $T_2$, $T_8$, $T_4$, and $T_{10}$. The output of the comparator 6 obtained in this way is shown in FIG. 13(d). The logic level of FIG. 13(d) shows the reading out mode (level "H") and the writing in mode (level "L") against the field memory 8.

The writing in mode and the reading out mode as described are those modes using the random input port and the random output port of the multiport memory used for the field memory 8 described above, with the reading out mode meaning only that writing into the memory is not conducted, and does not mean that the memory content is read out. Instead, the output of the memory content in the original reading out mode is conducted with the use of the serial port, and it is presumed that the random input is asynchronously operated.

By conducting the supply of the comparison voltage in this way, it is possible to write in a reproduced signal whose envelope is smoothly continuous while being interpolated at every field into the field memory 8, whereby a high quality reproduced picture image having minimum noisebar and blur is obtained.

The above described operation will be described with reference to the flowchart shown in FIG. 14. The vertical synchronous signal is made a reference of the time axis, and the level at the vertical blanking period is made "L".

Figure 14:
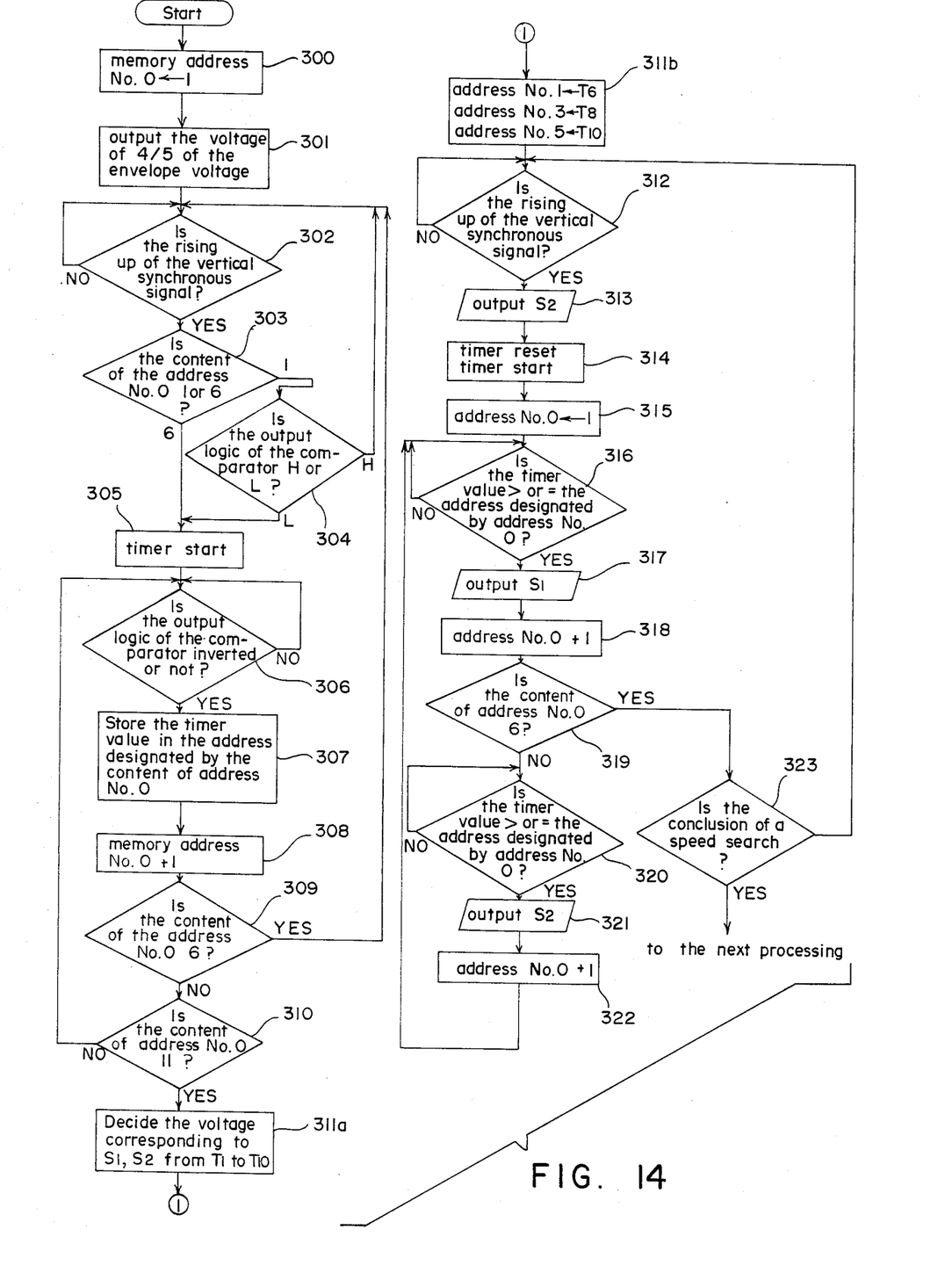
FIG. 14 is a flowchart for explaining the third mode of operation of the device of FIG. 8.

In the flowchart of FIG. 14, first of all, the zero address of the data memory 23 is initialized to establish an address "1" (step 300). Next, a voltage of four fifths of the maximum voltage of the envelope detection signal is supplied to the comparator 6 by inputting data corresponding to that voltage is supplied to the D/A converter 30 through the I/O circuit 21 (step 301). Then, the rising edge of the vertical synchronous signal output from the video signal processing circuit 4 is detected (step 302). Next, when the output logic of the comparator 6 becomes "L" in a state where the content of the zero address is "1", the timer 24 is started, and in a case where it is "6" the timer 24 is started regardless of the output logic of the comparator 6 (step 303, 304, and 305). This is conducted to distinguish the (a) and (b) waveforms of FIG. 7, and to conduct the following operation from in the case of (a).

When the output of the comparator 6 is inverted after the timer 24 is started, the value of the timer 24 at that timing is stored at the address No. 1 of the data memory 23 (steps 306 and 307). Then, "1" is added to the content of the zero address of the memory to make the same "2" (step 308). Then, the step returns to the step 306, to conduct a similar operation, and stores the time length from the start of the timer 24 to the timing when the output logic of the comparator 6 is inverted in the addresses No. 1 to No. 5. Thereafter, when the content of the zero address becomes "6" by adding "1" (step 308), the step returns to the step 302 (step 309), and also for the second field a similar operation as that of the first field is conducted, thereby to store the time length in the addresses No. 1 to No. 6. When the content of the zero address becomes "11", the voltages of the $S_1$ and the $S_2$ levels are determined as the comparison voltages of the comparator 6 on the basis of the times $T_1$ to $T_{10}$ stored at the addresses No. 1 to No. 10 by the above described method (step 310, 311a).

Next, the content of the address No. 6 is stored in the address No. 1, the content of the address No. 8 is stored in the address No. 2, and the content of the address No. 10 is stored in the address No. 5 (step 311b). This is a preparation for alternately switching the comparison voltage at the timings of $T_6$, $T_2$, $T_8$, $T_4$, and $T_{10}$. If the rising edge of the vertical synchronous signal is detected (step 312), a voltage corresponding to the $S_2$ is output through D/A converter 30 from the microcomputer 20 as a comparison voltage of the comparator 6 (step 313). Then, the timer 25 is reset and started (step 314), and "1" is stored at the zero address to conduct an initialization (step 315). Then, at an instance when the value of the timer 24 becomes equal to the value of $T_6$ stored in the first address or exceeds the same the comparison voltage is switched from $S_1$ to $S_2$ (step 316 and 317). Then, "1" is added to the content of the zero address thereby to make the same "2", and the comparison voltage is switched from $S_2$ to $S_1$ at an instance when the value of the timer 24 becomes larger than the value of $T_2$ which is stored in the address No. 2 (step 318, 320, and 321). Similarly as above, when the value of the timer 24 becomes larger than the value of $T_8$, $T_4$, $T_{10}$ stored in addresses No. 3 to No. 5, the $S_1$ and $S_2$ are switched alternately.

When the content of the zero address becomes "6" at the step 319, one field processing is completed. Then, the step goes to the step 323, and when the speed search is completed at this timing the step goes to the next processing. When it is not completed the step returns to the step 312 to repeat the similar operation.

In this embodiment the recording track width is detected from the envelope detection signal, and the comparison voltage of the comparator 6 is determined in accordance therewith, whereby it is possible to of obtain a high quality reproduced video image by always minimizing the widths of the noisebars with no hand manual adjustment when a tape recorded with any track width is used.

In the above illustrated embodiment, a four times speed reproduction is described as a high speed reproduction, but the present invention is not limited thereto, but is applicable to any type of high speed reproduction such as an even number times speed with the same effects as described above.

In the above illustrated embodiment a microcomputer is used, but each control means can be constituted by a hardware with the same effects as described above.

Furthermore, as a field memory a multiport memory is used, but a general purpose memory can be used.

As is evident from the foregoing description, according to the present invention, the recording track width on a tape is detected from the envelope signal of the reproduced signal, and the optimum comparison voltage which is to be supplied to the comparator is determined from the detection result, and the writing in range into the memory is automatically adjusted, whereby high quality high speed reproduction can be obtained with minimizing noisebars even when a tape having whatever recording track width is used. Furthermore, in a case where the output level of the reproduced signal is also used for determining the optimum comparison voltage to the comparator the reproduced signal level is not influenced by the property of the magnetic tape and the variations of the level of the video head output.

What is claimed is:

1. A video recording and reproducing apparatus, comprising:
   at least two rotation heads for reproducing a recorded signal from a magnetic tape in which recording tracks are oriented diagonally relative to the running direction of said magnetic tape;
   an envelope detector for extracting an envelope signal of the reproduced signal from the output signal of said rotation heads;
   a comparator for outputting a binary signal as a result of a comparison of the output of said envelope detector with a reference signal;

detection means for detecting the track width of a recording track by measuring the period of one of the levels of the output of said comparator;

storage means for storing a plurality of optimum reference signals corresponding to the output of said detection means;

means for replacing the reference signal of said comparator with a reference signal selected from said storage means in accordance with the output of said detection means; and a storing circuit for writing in the reproduced signal when the output of said envelope detector is larger than the optimum reference signal established at said comparator and reading out the written in content asynchronously with the writing in.

2. A video recording and reproducing apparatus as defined in claim 1, wherein said reproduced signal is obtained from said rotation heads in a state where said magnetic tape is running at an even number times speed of the recording speed.

3. A video recording and reproducing apparatus as defined in claim 2, wherein said comparator has a reference signal of about one third of the maximum level of the reproduced signal which is previously established.

4. A video recording and reproducing apparatus as defined in claim 2, wherein said detection means is designed to detect the track width of the recording track and the level of the reproduced signal by measuring the period of one of the levels of the output of said comparator.

5. A video recording and reproducing apparatus as defined in claim 4, wherein said detection means is designed to judge the maximum level of the reference signal as a level of the reproduced signal when the level of the reference signal of the comparator is increased so as to make one level period of the output of said comparator zero.

6. A video recording and reproducing apparatus as defined in claim 2, further including establishing means for establishing each optimum reference signal selected from said storage means by switching optimum reference signals alternately in accordance with the reproduced signal obtained by the switching of said rotation heads.

7. A video recording and reproducing apparatus as defined in claim 6, wherein said comparator has a previously established reference signal of about four fifths of the maximum level of the reproduced signal.

8. A video recording and reproducing apparatus as defined in claim 6, wherein said detection means, said storage means, and said establishing means are constituted by a microcomputer including an I/O circuit, a program memory which stores a predetermined operation sequence, a microprocessor for processing an input signal in accordance with said operation sequence, a data memory for temporarily storing an input and output signal of said microprocessor, and a timer which provides an operation reference to said microprocessor.

9. A video recording and reproducing apparatus as defined in claim 8, wherein the output of said microcomputer is supplied to said comparator through a D/A converter.

10. A video recording and reproducing apparatus as defined in claim 1, wherein said memory circuit is a multiport memory for reading out the written in content of said memory circuit asynchronously at the same time as the writing in of the reproduced signal at a serial port.

* * * * *